(12) United States Patent
Hashizume

(10) Patent No.: US 11,759,948 B2
(45) Date of Patent: Sep. 19, 2023

(54) ROBOT

(71) Applicant: SEIKO EPSON CORPORATION, Tokyo (JP)

(72) Inventor: Keitaro Hashizume, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 218 days.

(21) Appl. No.: 17/211,838

(22) Filed: Mar. 25, 2021

(65) Prior Publication Data

US 2021/0299865 A1 Sep. 30, 2021

(30) Foreign Application Priority Data

Mar. 26, 2020 (JP) ................. 2020-056349

(51) Int. Cl.
*B25J 9/10* (2006.01)
*B25J 9/16* (2006.01)

(52) U.S. Cl.
CPC ............ *B25J 9/1651* (2013.01); *B25J 9/104* (2013.01)

(58) Field of Classification Search
CPC ....................................................... B25J 9/104
See application file for complete search history.

(56) References Cited

U.S. PATENT DOCUMENTS

2018/0326585 A1  11/2018  Miyasaka et al.
2019/0291268 A1   9/2019  Adachi

FOREIGN PATENT DOCUMENTS

| CN | 105751209 A | * | 7/2016 |
| CN | 110303520 A |   | 10/2019 |
| JP | 2011020213 A |  | 2/2011 |
| JP | 2018187748 A |  | 11/2018 |

OTHER PUBLICATIONS

Search Report of the First Office Action CN Application No. 202110309498X dated May 4, 2023.

* cited by examiner

*Primary Examiner* — Randell J Krug
(74) *Attorney, Agent, or Firm* — Yu Gang

(57) ABSTRACT

A robot includes a robot arm including a proximal-end-side arm and a first distal-end-side arm that is turnable with respect to the proximal-end-side arm and coupled further on a distal end side than the proximal-end-side arm. The proximal-end-side arm includes a first motor configured to drive the first distal-end-side arm, a first speed reducer configured to reduce rotating speed of the first motor and output a rotational force, a first pulley configured to transmit, to the first distal-end-side arm, the rotational force output from the first speed reducer, and a first belt configured to transmit, from the first speed reducer to the first pulley, the rotational force output from the first speed reducer.

6 Claims, 5 Drawing Sheets

ROBOT

The present application is based on, and claims priority from JP Application Serial Number 2020-056349, filed Mar. 26, 2020, the disclosure of which is hereby incorporated by reference herein in its entirety.

BACKGROUND

1. Technical Field

The present disclosure relates to a robot.

2. Related Art

In recent years, in factories, automation of manually performed work has been accelerated by various robots and peripheral devices of the robots because of a surge in personal expenses and labor shortage. For example, a robot described in JP-A-2011-20213 (Patent Literature 1) includes a base fixed to a floor surface and an arm provided in the base. The arm includes a base, a first arm, a second arm functioning as a proximal-end-side arm, and a wrist member functioning as a first distal-end-side arm and a second distal-end-side arm.

The robot described in Patent Literature 1 includes a first motor and a second motor. Power of the first motor is transmitted to a first driven rotating mechanism via a speed reducer. The wrist member turns around a J5 axis. Power of the second motor is transmitted to a second driven rotating mechanism. The wrist member turns around a J6 axis. In the robot, in order to detach the wrist member, the first driven rotating mechanism and the second driven rotating mechanism need to be detached from the second arm. Further, when the detached wrist member is attached to the second arm, the first driven rotating mechanism and the second driven rotating mechanism need to be set in the second arm and assembled.

In such a robot, for example, when maintenance work is performed, the wrist member is sometimes detached from the second arm. However, it has been a trouble to perform attachment and detachment operation for the wrist member.

SUMMARY

A robot according to an aspect of the present disclosure includes a robot arm including a proximal-end-side arm and a first distal-end-side arm that is turnable with respect to the proximal-end-side arm and coupled further on a distal end side than the proximal-end-side arm. The proximal-end-side arm includes a first motor configured to drive the first distal-end-side arm, a first speed reducer configured to reduce rotating speed of the first motor and output a rotational force, a first pulley configured to transmit, to the first distal-end-side arm, the rotational force output from the first speed reducer, and a first belt configured to transmit, from the first speed reducer to the first pulley, the rotational force output from the first speed reducer.

DESCRIPTION OF EXEMPLARY EMBODIMENTS

First Embodiment

Figure 1:
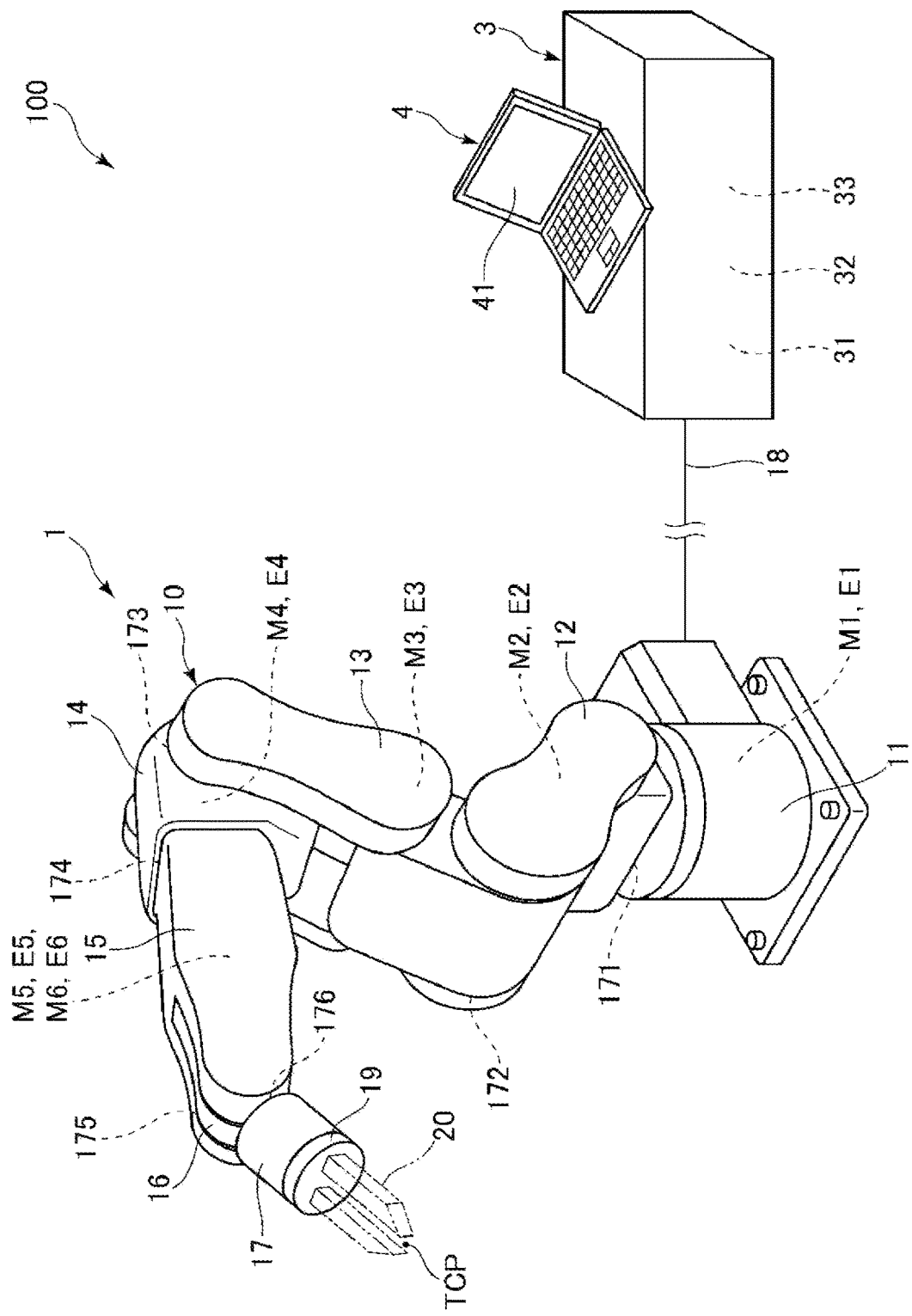
FIG. 1 is a diagram showing an overall configuration of a robot system in a first embodiment.
Figure 2:
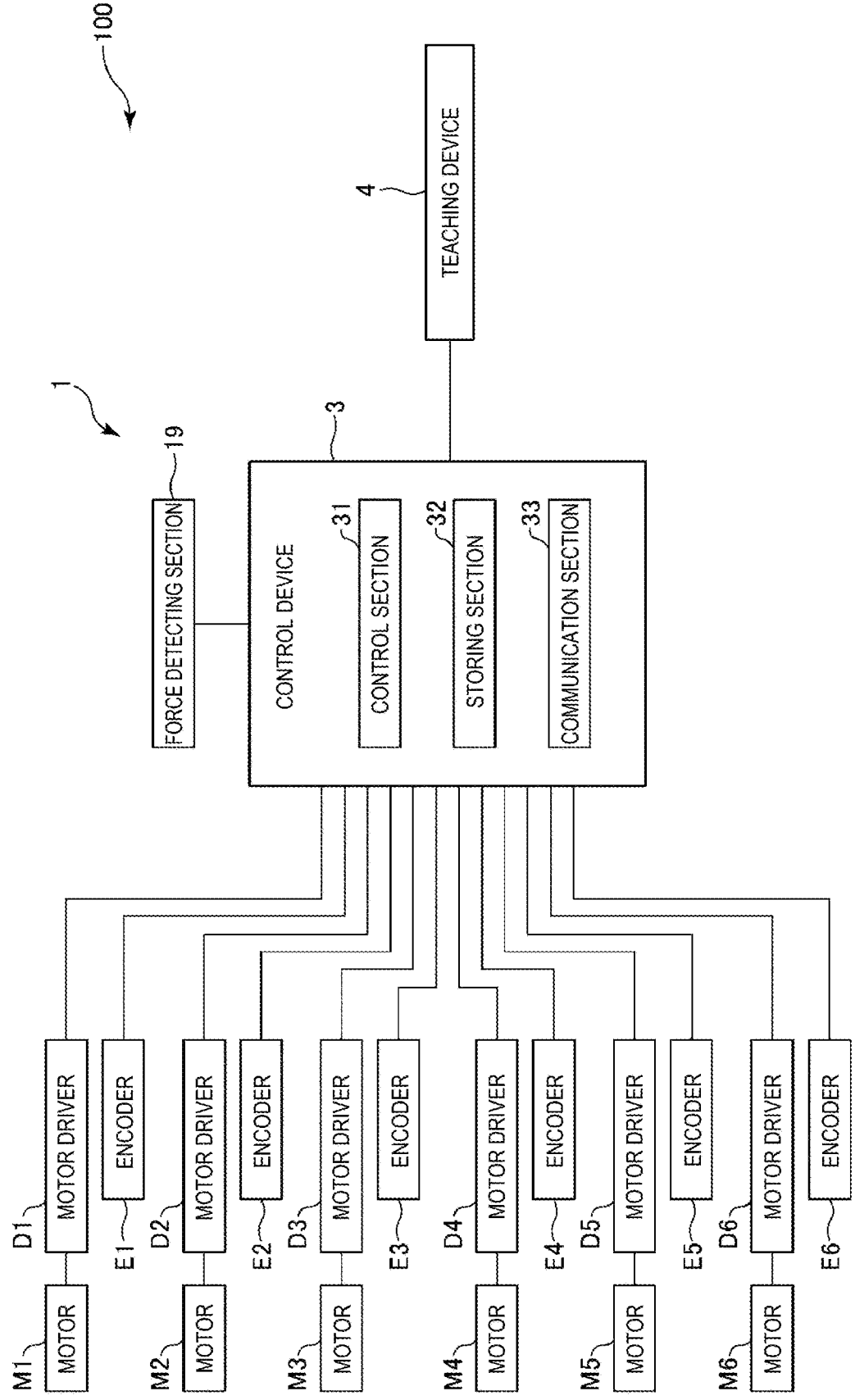
FIG. 2 is a block diagram of the robot system shown in FIG. 1.
Figure 3:
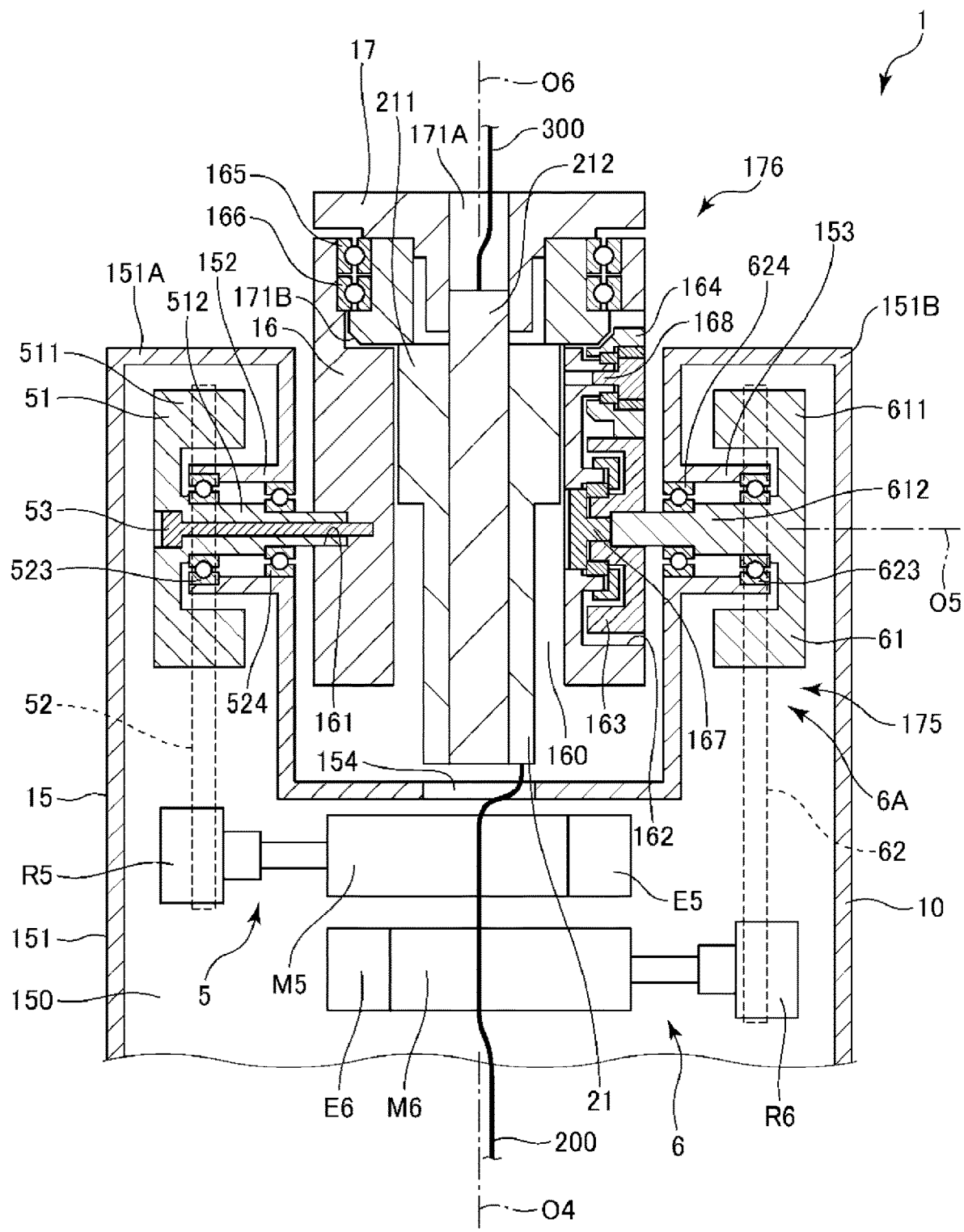
FIG. 3 is a longitudinal sectional view of a distal end portion of a robot shown in FIG. 1.
Figure 4:
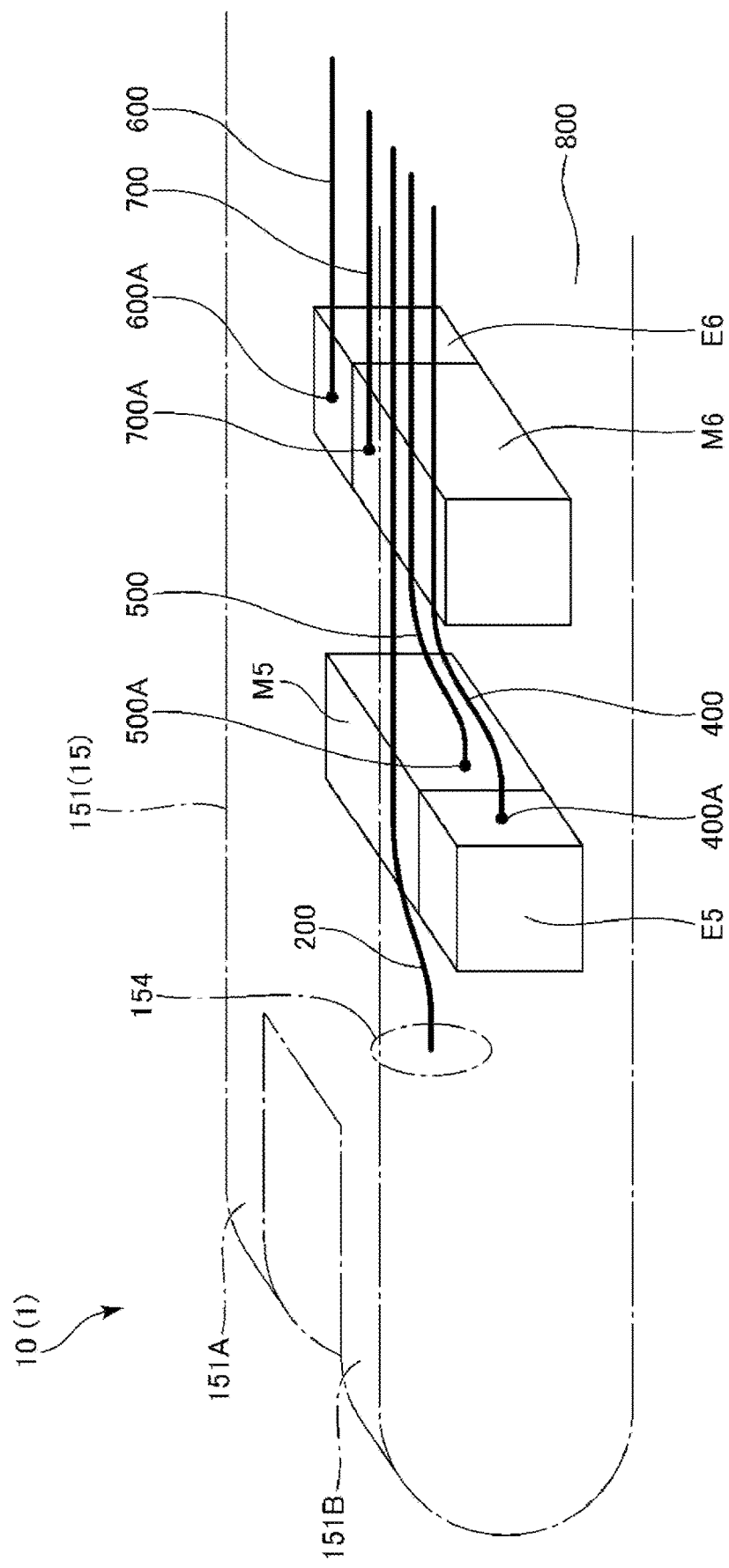
FIG. 4 is a perspective view for explaining an example of an internal configuration of a fourth arm included in the robot shown in FIG. 1.
Figure 5:
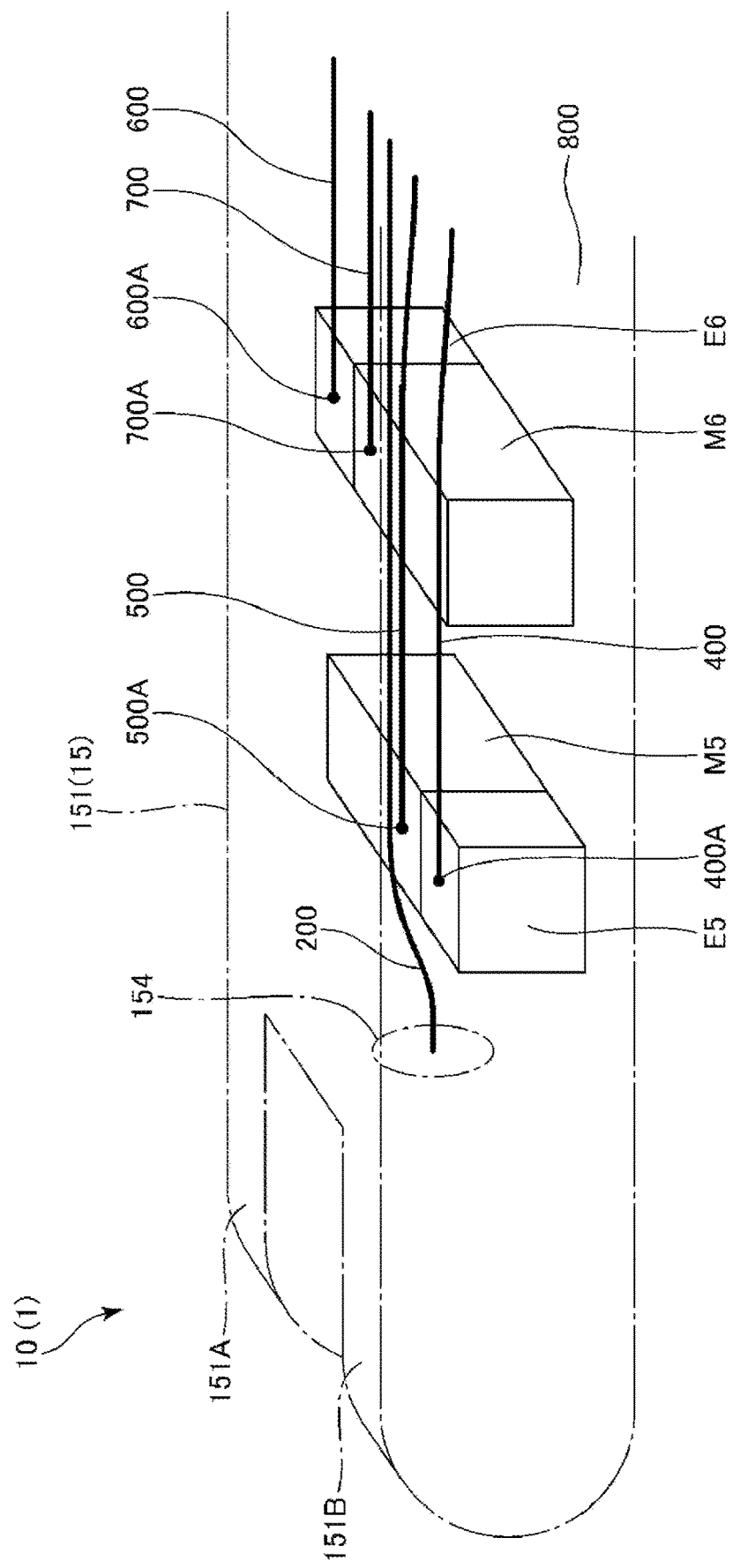
FIG. 5 is a perspective view for explaining another example of the internal configuration of the fourth arm included in the robot shown in FIG. 1.

FIG. 1 is a diagram showing an overall configuration of a robot system in a first embodiment. FIG. 2 is a block diagram of the robot system shown in FIG. 1. FIG. 3 is a longitudinal sectional view of a distal end portion of a robot shown in FIG. 1. FIG. 4 is a perspective view for explaining an example of an internal configuration of a fourth arm 15 included in the robot shown in FIG. 1. FIG. 5 is a perspective view for explaining another example of the internal configuration of the fourth arm 15 included in the robot shown in FIG. 1.

A robot of the present disclosure is explained in detail below based on a preferred embodiment shown in the accompanying drawings. In the following explanation, for convenience of explanation, concerning a robot arm, in FIG. 1, a base 11 side is referred to as "proximal end" as well and the opposite side of the base 11 side, that is, an end effector 20 side is referred to as "distal end" as well. In FIG. 4, the upper side is the distal end side and the lower side is the proximal end side. In FIGS. 5 and 6, the left side is the distal end side and the right side is the proximal end side.

As shown in FIG. 1, a robot system 100 includes a robot 1, a control device 3 that controls the robot 1, and a teaching device 4.

First, the robot 1 is explained.

The robot 1 shown in FIG. 1 is a single-arm six-axis vertical articulated robot in this embodiment and includes a base 11 and a robot arm 10. An end effector 20 can be attached to the distal end portion of the robot arm 10. The end effector 20 may be a constituent element of the robot 1 and may not be the constituent element of the robot 1.

The robot 1 is not limited to the configuration shown in FIG. 1 and may be, for example, a double-arm articulated robot. The robot 1 may be a horizontal articulated robot.

The base 11 is a supporting body that supports the robot arm 10 from the lower side to be able to be driven. The base 11 is fixed to, for example, a floor in a factory. In the robot 1, the base 11 is electrically coupled to the control device 3 via a relay cable 18. The connection of the robot 1 and the control device 3 is not limited to connection by wire as in the configuration shown in FIG. 1 and may be, for example, connection by radio. Further, the robot 1 and the control device 3 may be coupled via a network such as the Internet.

In this embodiment, the robot arm 10 includes a first arm 12, a second arm 13, a third arm 14, a fourth arm 15, a fifth arm 16, and a sixth arm 17. These arms are coupled in this order from the base 11 side. The number of arms included in the robot arm 10 is not limited to six and may be, for example, one, two, three, four, five, or seven or more. The sizes such as the total lengths of the arms are not respectively particularly limited and can be set as appropriate.

The base 11 and the first arm 12 are coupled via a joint 171. The first arm 12 is capable of turning, with respect to the base 11, around a first turning axis parallel to the vertical direction with the first turning axis as a turning center. The first turning axis coincides with the normal of a floor to which the base 11 is fixed.

The first arm 12 and the second arm 13 are coupled via a joint 172. The second arm 13 is capable of turning with respect to the first arm 12 with a second turning axis parallel to the horizontal direction as a turning center. The second turning axis is parallel to an axis orthogonal to the first turning axis.

The second arm 13 and the third arm 14 are coupled via a joint 173. The third arm 14 is capable of turning with respect to the second arm 13 with a third turning axis parallel to the horizontal direction as a turning center. The third turning axis is parallel to the second turning axis.

The third arm 14 and the fourth arm 15 are coupled via a joint 174. The fourth arm 15 is capable of turning with respect to the third arm 14 with a fourth turning axis parallel to the center axis direction of the third arm 14 as a turning center. The fourth turning axis is orthogonal to the third turning axis.

The fourth arm 15 and the fifth arm 16 are coupled via a joint 175. The fifth arm 16 is capable of turning with respect to the fourth arm 15 with a fifth turning axis (an axis O5) as a turning center. The fifth turning axis is orthogonal to the fourth turning axis.

The fifth arm 16 and the sixth arm 17 are coupled via a joint 176. The sixth arm 17 is capable of turning with respect to the fifth arm 16 with a sixth turning axis (an axis O6) as a turning center. The sixth turning axis is orthogonal to the fifth turning axis.

The sixth arm 17 is a robot distal end portion located on the most distal end side in the robot arm 10. The sixth arm 17 can turn together with the end effector 20 according to the driving of the robot arm 10.

The robot 1 includes a motor M1, a motor M2, a motor M3, a motor M4, a motor M5, and a motor M6 functioning as driving sections and an encoder E1, an encoder E2, an encoder E3, an encoder E4, an encoder E5, and an encoder E6. The motor M1 is incorporated in the joint 171 and relatively rotates the base 11 and the first arm 12. The motor M2 is incorporated in the joint 172 and relatively rotates the first arm 12 and the second arm 13. The motor M3 is incorporated in the joint 173 and relatively rotates the second arm 13 and the third arm 14. The motor M4 is incorporated in the joint 174 and relatively rotates the third arm 14 and the fourth arm 15. The motor M5 is incorporated in the fourth arm 15 and relatively rotates the fourth arm 15 and the fifth arm 16. The motor M6 is incorporated in the fourth arm 15 and relatively rotates the fifth arm 16 and the sixth arm 17.

The encoder E1 is incorporated in the joint 171 and detects the position of the motor M1. The encoder E2 is incorporated in the joint 172 and detects the position of the motor M2. The encoder E3 is incorporated in the joint 173 and detects the position of the motor M3. The encoder E4 is incorporated in the joint 174 and detects the position of the motor M4. The encoder E5 is incorporated in the fourth arm 15 and detects the position of the motor M5. The encoder E6 is incorporated in the fourth arm 15 and detects the position of the motor M6.

The motor M5, the motor M6, the encoder E5, and the encoder E6 are not disposed in the joint 175 and the joint 176.

The encoders E1 to E6 are electrically coupled to the control device 3. Position information, that is, rotation amounts of the motors M1 to M6 are transmitted to the control device 3 as electric signals. The control device 3 drives the motors M1 to M6 via not-shown motor drivers D1 to D6 based on this information. That is, controlling the robot arm 10 means controlling the motors M1 to M6.

In the robot 1, a force detecting section 19 that detects force is detachably set in the robot arm 10. The robot arm 10 can be driven in a state in which the force detecting section 19 is set. In this embodiment, the force detecting section 19 is a six-axis force sensor. The force detecting section 19 detects the magnitudes of forces on three detection axes orthogonal to one another and the magnitudes of torques around the three detection axes. The force detecting section 19 is not limited to the six-axis force sensor and may be sensors having other configurations.

In this embodiment, the force detecting section 19 is set in the sixth arm 17. A setting part of the force detecting section 19 is not limited to the sixth arm 17, that is, an arm located on the most distal end side and may be, for example, another arm or a part between adjacent arms.

The end effector 20 can be detachably attached to the force detecting section 19. In this embodiment, the end effector 20 is configured by a hand that includes a pair of claw sections capable of approaching and separating from each other and grips and releases a workpiece with the claw sections. The end effector 20 is not limited to the configuration shown in FIG. 1 and may be a hand that grips a work target object by suction. The end effector 20 may be a polisher, a grinder, or a cutter or a tool such as a screwdriver or a wrench. The force detecting section 19 may be omitted and the end effector 20 may be provided in the sixth arm 17.

In a robot coordinate system, a tool center point TCP, which is a control point, is set at the distal end of the end effector 20. In the robot system 100, by grasping the position of the tool center point TCP in the robot coordinate system, the tool center point TCP can be set as a reference of control.

The control device 3 and the teaching device 4 are explained.

As shown in FIG. 1, in this embodiment, the control device 3 is set in a position away from the robot 1. However, the control device 3 is not limited to this configuration and may be incorporated in the base 11. The control device 3 has a function of controlling driving of the robot 1 and is electrically coupled to the sections of the robot 1. The control device 3 includes a control section 31, a storing section 32, and a communication section 33. These sections are communicably coupled to one another via, for example, a bus.

The control section 31 is configured by, for example, a CPU (Central Processing Unit) and reads out and executes various programs such as an operation program stored in the storing section 32. A signal generated by the control section 31 is transmitted to the sections of the robot 1 via the communication section 33. Consequently, for example, the robot arm 10 can execute predetermined work under predetermined conditions. The storing section 32 saves various programs and the like executable by the control section 31. Examples of the storing section 32 includes a volatile memory such as a RAM (Random Access Memory), a nonvolatile memory such as a ROM (Read Only Memory), and a detachable external storage device. The communication section 43 transmits and receives signals to and from the control device 3 using an external interface such as a wireless LAN.

As shown in FIGS. 1 and 2, the teaching device 4 has a function of creating an operation program and inputting the operation program to the robot arm 10. The teaching device 4 includes a control section 41, a storing section 42, and a communication section 43. The teaching device 4 is not particularly limited. Examples of the teaching device 4 include a tablet computer, a personal computer, a smartphone, and a teaching pendant.

The configuration of the robot system 100 is briefly explained above.

The structure of a finger portion of the robot arm 10, that is, the fourth to sixth arms 15 to 17 is explained in detail below.

As shown in FIG. 3, the fourth arm 15 is a proximal-end-side arm in the finger portion of the robot arm 10. The fourth arm 15 includes an arm main body 151, a first driving unit 5, and a second driving unit 6.

The arm main body 151 is configured by a long casing including a hollow section 150. The first driving unit 5 and a main section 6A of the second driving unit 6 are housed in the hollow section 150. The arm main body 151 includes a first supporting section 151A and a second supporting section 151B provided to project to the distal end side. The main section 6A of the second driving unit 6 means a speed reducer R6, a belt 62, and a pulley 61.

The first supporting section 151A and the second supporting section 151B are disposed via a center axis O4 of the fourth arm 15. The first supporting section 151A and the second supporting section 151B support the fifth arm 16 therebetween to be capable of turning around the axis O5.

The insides of the first supporting section 151A and the second supporting section 151B are hollow and configure a part of the hollow section 150. A pulley 51 of the first driving unit 5 is set on the inside of the first supporting section 151A. The pulley 61 of the main section 6A of the second driving unit 6 is set on the inside of the second supporting section 151B.

In this way, the fifth arm 16, which is a first distal-end-side arm, is disposed between the first supporting section 151A and the second supporting section 151B. Consequently, it is possible to support the fifth arm 16 by both sides and realize stable and smooth rotation of the fifth arm 16.

The first driving unit 5 is a driving unit for driving the fifth arm 16, which is a first distal-end-side arm. The first driving unit 5 includes the motor M5, a speed reducer R5, the encoder E5, the pulley 51, a belt 52, and a shaft 53.

The motor M5 is a driving source that drives the fifth arm 16. The encoder E5 detects a rotation amount of the motor M5. The motor M5 and the encoder E5 are set in the hollow section 150 and further on the proximal end side than the first supporting section 151A and the second supporting section 151B. The motor M5 and the encoder E5 are set in positions overlapping the center axis O4. The motor M5 and the encoder E5 are fixed to, for example, any portion of the inner wall of the arm main body 151.

As shown in FIG. 2, the motor M5 is electrically coupled to the control device 3. The operation of the motor M5 is controlled by the control device 3. The encoder E5 is electrically coupled to the control device 3. Information concerning the rotation amount of the motor M5 detected by the encoder E5 is converted into an electric signal and transmitted to the control device 3.

The speed reducer R5 reduces and outputs a rotational force output by the motor M5. The speed reducer R5 is set further on the first supporting section 151A side than the center axis O4. The speed reducer R5 is not particularly limited. For example, a planetary gear-type speed reducer and a wave motion gear device can be used as the speed reducer R5.

The belt 52 is wound around an output shaft of the speed reducer R5. The belt 52 transmits a rotational force from the speed reducer R5 to the pulley 51. The belt 52 is configured by an endless belt and has teeth on the surface on the inner side of the belt 52. The teeth of the belt 52 are meshed with teeth formed on the output shaft of the speed reducer R5. Accordingly, a rotational force of the output shaft of the speed reducer R5 is transmitted to the belt 52 and the belt 52 rotates. The teeth of the belt 52 are meshed with teeth formed in the outer circumferential portion of the pulley 51. That is, the belt 52 is wound around the output shaft of the speed reducer R5 and the outer circumferential portion of the pulley 51. Accordingly, the rotational force output from the speed reducer R5 is transmitted to the pulley 51 via the belt 52.

The pulley 51 transmits, to the fifth arm 16, the rotational force output from the speed reducer R5. The pulley 51 includes an outer cylinder 511 and an inner cylinder 512. The outer cylinder 511 is formed in a bottomed shape. The belt 52 is wound around the outer circumferential portion of the outer cylinder 511. The inner cylinder 512 is erected from the bottom of the outer cylinder 511. The inner cylinder 512 is longer than the outer cylinder 511. In this embodiment, the inner cylinder 512 is inserted into a recess 161 of the fifth arm 16. The cross sectional shape of a portion of the inner cylinder 512 inserted into the recess 161 may have a circular shape or may be, for example, a D-cut shape. In the case of the D-cut shape, rotation of the inner cylinder 512 and the fifth arm 16 is restricted. The rotational force of the pulley 51 is transmitted to the fifth arm 16.

Two parts of the outer circumferential portion of the inner cylinder 512 are fixed to the inside of the arm main body 151 of the fourth arm 15 by a bearing 523 and a bearing 524. Specifically, a projecting section 152 projecting in a tubular shape toward the inner side is formed in a portion of the inner wall of the first supporting section 151A facing the fifth arm 16.

The inner cylinder 512 of the pulley 51 is inserted into the inner circumferential portion of the projecting section 152. The bearing 523 and the bearing 524 are fixed between the inner cylinder 512 and the inner circumferential portion. The projecting section 152 is located between the outer cylinder 511 and the inner cylinder 512. Inner rings of the bearing 523 and the bearing 524 are fixed to the outer circumferential portion of the inner cylinder 512 of the pulley 51. Outer rings of the bearing 523 and the bearing 524 are fixed to the inner circumferential portion of the projecting section 152. With such a configuration, the pulley 51 is rotatably supported by the arm main body 151.

A bore section of the inner cylinder 512 is opened to the outer side of the bottom of the outer cylinder 511. The shaft 53 is inserted into the inner cylinder 512 from the opened side. The shaft 53 can be inserted into and removed from the inner cylinder 512. In a state in which the shaft 53 is inserted into the inner cylinder 512, the shaft 53 projects further to the fifth arm 16 side than the inner cylinder 512 and is inserted into the recess 161.

The cross sectional shape of the shaft 53 is a shape for restricting rotation of the shaft 53 with respect to the inner cylinder 512 and the fifth arm 16 such as a D-cut shape. In the case of the D-cut shape, rotation of the shaft 53 and the fifth arm 16 is restricted. The rotational force of the pulley 51 is transmitted to the fifth arm 16.

With such a first driving unit 5, the rotational force output by the motor M5 is transmitted to the fifth arm 16 via the speed reducer R5, the belt 52, the pulley 51, and the shaft 53. Accordingly, the fifth arm 16 can be rotated around the axis O5.

In this way, the fourth arm 15, which is a proximal-end-side arm, includes the shaft 53 that is inserted into the pulley 51, which is a first pulley, and the fifth arm 16, which is a first distal-end-side arm, and transmits the rotational force of the pulley 51 to the fifth arm 16. Consequently, the rotational force of the pulley 51 can be transmitted to the fifth arm 16.

The shaft 53 can be inserted into and removed from the pulley 51, which is the first pulley, and the fifth arm 16, which is the first distal-end-side arm. Consequently, as explained below, operation for attaching the fifth arm 16 to and detaching the fifth arm 16 from the fourth arm 15 can be performed by a simple method of selecting insertion of the shaft 53 into and removal of the shaft 53 from the pulley 51 and the first distal-end-side arm.

The second driving unit 6 is explained. The second driving unit 6 is a driving unit for driving the sixth arm 17, which is a second distal-end-side arm. The second driving unit 6 includes the motor M6, the speed reducer R6, the encoder E6, the pulley 61, and the belt 62.

The motor M6 is a driving source that drives the sixth arm 17. The encoder E6 detects a rotation amount of the motor M6. The motor M6 and the encoder E6 are set in the hollow section 150 and further on the proximal end side than the first supporting section 151A and the second supporting section 151B. The motor M6 and the encoder E6 are set in positions overlapping the center axis O4. The motor M6 and the encoder E6 are fixed to, for example, any portion of the inner wall of the arm main body 151. The motor M6 and the encoder E6 are set further on the proximal end side than the motor M5 and the encoder E5.

As shown in FIG. 2, the motor M6 is electrically coupled to the control device 3. The operation of the motor M6 is controlled by the control device 3. The encoder E6 is electrically coupled to the control device 3. Information concerning the rotation amount of the motor M6 detected by the encoder E6 is converted into an electric signal and transmitted to the control device 3.

As shown in FIG. 3, the speed reducer R6 reduces and outputs a rotational force output by the motor M6. The speed reducer R6 is set further on the second supporting section 151B side than the center axis O4. The speed reducer R6 is not particularly limited. For example, a planetary gear-type speed reducer and a wave motion gear device can be used.

The belt 62 is wound around an output shaft of the speed reducer R6. The belt 62 transmits a rotational force from the speed reducer R6 to the pulley 61. The belt 62 is configured by an endless belt and has teeth on the surface on the inner side of the belt 62. The teeth of the belt 62 are meshed with teeth formed on the output shaft of the speed reducer R6. Accordingly, a rotational force of the output shaft of the speed reducer R6 is transmitted to the belt 62 and the belt 62 rotates. The teeth of the belt 62 are meshed with teeth formed in the outer circumferential portion of the pulley 61. That is, the belt 62 is wound around the output shaft of the speed reducer R6 and the outer circumferential portion of the pulley 61. Accordingly, the rotational force output from the speed reducer R6 is transmitted to the pulley 61 via the belt 62.

The pulley 61 transmits, to the fifth arm 16, the rotational force output from the speed reducer R6. The pulley 61 includes an outer cylinder 611 and a shaft section 612 projecting from the outer cylinder 611. The outer cylinder 611 is formed in a bottomed shape. The belt 62 is wound around the outer circumferential portion of the outer cylinder 611. The shaft section 612 is erected from the bottom of the outer cylinder 611. The shaft section 612 is longer than the outer cylinder 611. In this embodiment, the shaft section 612 is inserted into a gear 163 set in the fifth arm 16. The cross sectional shape of a portion of the shaft section 612 inserted into the gear 163 is, for example, a D-cut shape. Consequently, rotation of the shaft section 612 and the gear 163 is restricted. The rotational force of the pulley 61 is transmitted to the gear 163.

Two parts of the outer circumferential portion of the shaft section 612 are fixed to the inside of the arm main body 151 of the fourth arm 15 by a bearing 623 and a bearing 624. Specifically, a projecting section 153 projecting in a tubular shape toward the inner side is formed in a portion of the inner wall of the second supporting section 151B facing the fifth arm 16.

The shaft section 612 of the pulley 61 is inserted into the inner circumferential portion of the projecting section 153. The bearing 623 and the bearing 624 are fixed between the shaft section 612 and the inner circumferential portion. The projecting section 153 is located between the outer cylinder 611 and the shaft section 612. Inner rings of the bearing 623 and the bearing 624 are fixed to the outer circumferential portion of the shaft section 612 of the pulley 61. Outer rings of the bearing 623 and the bearing 624 are fixed to the inner circumferential portion of the projecting section 153. With such a configuration, the pulley 61 is rotatably supported by the arm main body 151.

With such a second driving unit 6, the rotational force output by the motor M6 is transmitted to the gear 163 and a gear 164, which are power transmitting sections, via the speed reducer R6, the belt 62, and the pulley 61, which are the main section 6A. The rotational force is transmitted to the sixth arm 17 via the gear 163 and the gear 164. Consequently, the sixth arm 17 can be rotated around the axis O6.

The fifth arm 16, which is the first distal-end-side arm, is explained. The fifth arm 16 is formed in a tubular shape including a bore section 160. The sixth arm 17 is fixed to the distal end side of the bore section 160 via a bearing 165 and a bearing 166. Inner rings of the bearing 165 and the bearing 166 are fixed to the sixth arm 17. Outer rings of the bearing 165 and the bearing 166 are fixed to the inner surface of the fifth arm 16.

A rotating unit 21 is inserted into and fixed to the inside of the bore section 160 and further on the proximal end side than the sixth arm 17. The rotating unit 21 includes an outer cylinder 211 and a rotating body 212 that is provided in the outer cylinder 211 and rotates with respect to the outer cylinder 211. The outer circumferential portion of the outer cylinder 211 is fixed to the inner wall of the fifth arm 16. A wire 200 is coupled to the outer cylinder 211 from the proximal end side. The wire 200 is electrically coupled to a not-shown internal wire of the outer cylinder 211. The internal wire is electrically coupled to a not-shown electrode brush provided in the inner circumferential portion of the outer cylinder 211. The electrode brush is in contact with a not-shown electrode formed in the outer circumferential portion of the rotating body 212. Even if the rotating body 212 rotates with respect to the outer cylinder 211, the contact of the electrode brush and the electrode is maintained. The electrode of the rotating body 212 is electrically coupled to a wire 300 via a not-shown internal wire. The distal end portion of the rotating body 212 is fixed to the inner side of the sixth arm 17.

With such a rotating unit 21, when the sixth arm 17 rotates, the rotating body 212 rotates with respect to the outer cylinder 211 together with the sixth arm 17. Since the outer cylinder 211 does not rotate together with the sixth arm 17, the wire 200 is not twisted. A conduction state of the wire 200 and the wire 300 is maintained. The wire 200 is drawn around to the inside of the bore section 160 via a through-hole 154 provided in the arm main body 151.

A recess 162 is provided in the outer circumferential portion of the fifth arm 16 and in a portion facing the second supporting section 151B side. The gear 163 and the gear 164, which are power transmitting sections, are set in the recess 162 in a meshed state. The gear 163 and the gear 164 are disposed in this order along the axis O5 direction from the proximal end side. The gear 163 is rotatably supported by a protrusion 167 erected from the bottom of the recess 162. The gear 164 is rotatably supported by a protrusion 168 erected from the bottom of the recess 162.

The gear 164 includes bevel teeth 169 further on the axis O5 side than a portion meshed with the gear 163. The bevel teeth 169 are meshed with a bevel gear 171B of the sixth arm 17. Consequently, the rotational force output by the motor M6 is transmitted to the sixth arm 17 via the main section 6A, the gear 163, and the gear 164. Accordingly, the sixth arm 17 can be rotated around the axis O6.

As explained above, the fifth arm 16, which is the first distal-end-side arm, includes the gear 163 and the gear 164, which are the power transmitting sections that transmit the rotational force of the pulley 61, which is a second pulley, to the sixth arm 17, which is the second distal-end-side arm. Consequently, even if the second driving unit 6 is set in the fourth arm 15, the rotational force of the pulley 61 can be transmitted to the sixth arm 17 via the gear 163 and the gear 164 of the fifth arm 16.

The sixth arm 17 is an arm located on the most distal end side. The force detecting section 19, the end effector 20, and the like are attached to the distal end side of the sixth arm 17. As explained above, the sixth arm 17 is fixed to the inner circumferential portion of the fifth arm 16 via the bearing 165 and the bearing 166.

The sixth arm 17 is formed in a tubular shape. The proximal end portion of the rotating body 212 of the rotating unit 21 is inserted into and fixed to an inner circumferential section 171A of the sixth arm 17. As explained above, the bevel gear 171B is provided at the proximal end portion of the sixth arm 17. The bevel gear 171B is meshed with the bevel teeth 169 of the gear 164.

The configuration of the distal end portion of the robot arm 10 is explained above. When the fifth arm 16 and the sixth arm 17 are formed as the finger unit, the finger unit is sometimes detached, for example, when maintenance is performed. Examples of a method of detaching the finger unit include a method explained below. First, a part of the arm main body 151 is detached to remove the shaft 53 along the axis O5. The pulley 51 and the pulley 61 are shifted in directions in which the pulley 51 and the pulley 61 separate from each other. The pulley 51 and the pulley 61 are removed from the fifth arm 16. The finger unit is detached in a state in which the fourth arm 15 and the fifth arm 16 are uncoupled.

In related art, when the finger unit is detached, members equivalent to the pulley 51 and the pulley 61 are detached and, thereafter, the finger unit is detached. Work for detaching and reassembling the members equivalent to the pulley 51 and the pulley 61 is difficult work.

In contrast, in the robot 1, the first driving unit 5 and the second driving unit 6 are set in the fourth arm 15. That is, the motor M5, the speed reducer R5, the pulley 51, and the belt 52 and the motor M6, the speed reducer R6, the pulley 61, and the belt 62 are set in the fourth arm 15. Consequently, as explained above, it is possible to detach the finger unit without detaching these sections from the fourth arm 15.

That is, when the finger unit is detached, it is possible to easily perform operation for detaching the finger unit. When the finger unit is attached, it is possible to easily perform operation for attaching the finger unit. Besides the easiness of the attachment and detachment operation, it is also possible to obtain effects such as a reduction of an attachment and detachment operation time, suppression of fluctuation in assembly accuracy, and simplification of drawing-around of wires such as a power line and a control line.

The inside of the fourth arm 15 is explained.

As explained above, the motor M5, the encoder E5, the motor M6, and the encoder E6 are disposed in the hollow section 150 of the fourth arm 15.

The motor M5 and the encoder E5 and the motor M6 and the encoder E6 are disposed side by side in this order from the distal end side. The motor M5 is disposed on the first supporting section 151A side. The encoder E5 is disposed on the second supporting section 151B side. The motor M6 is disposed on the second supporting section 151B side. The encoder E6 is disposed on the first supporting section 151A side.

A terminal 400A is provided in the encoder E5. The encoder E5 is disposed in a posture in which the terminal 400A faces the proximal end side. A wire 400 is coupled to the terminal 400A. The wire 400 is drawn out to the proximal end side. The wire 400 passes the upper side in FIG. 4 of the motor M6 and the encoder E6, that is, the opposite side with respect to a setting surface 800, on which the motor M6 and the encoder E6 are set, via the motor M6 and the encoder E6.

A terminal 500A is provided in the motor M5. The motor M5 is disposed in a posture in which the terminal 500A faces the proximal end side. A wire 500 is coupled to the terminal 500A. The wire 500 is drawn out to the proximal end side. The wire 500 passes the upper side in FIG. 4 of the motor M6 and the encoder E6, that is, the opposite side with respect to the setting surface 800, on which the motor M6 and the encoder E6 are set, via the motor M6 and the encoder E6.

A terminal 600A is provided in the encoder E6. The encoder E6 is disposed in a posture in which the terminal 600A faces the upper side in FIG. 4, that is, a side to which the wire 200, the wire 400, and the wire 500 are drawn out. A wire 600 is coupled to the terminal 600A. The wire 600 is drawn out to the proximal end side.

A terminal 700A is provided in the motor M5. The motor M5 is disposed in a posture in which the terminal 700A faces the upper side in FIG. 4, that is, a side to which the wire 200, the wire 400, and the wire 500 are drawn out. A wire 700 is coupled to the terminal 700A. The wire 700 is drawn out to the proximal end side.

With such a configuration, the wire 200, the wire 400, the wire 500, the wire 600, and the wire 700 pass the same side of the motor M6 and the encoder E6, that is, the opposite side of the setting surface 800 without excessively steeply bending. Accordingly, the wire 200, the wire 400, the wire 500, the wire 600, and the wire 700 can be bound without receiving an excessive load.

A configuration shown in FIG. 5 may be adopted. In an example shown in FIG. 5, the encoder E5 is set in a direction in which the terminal 400A is located on the opposite side of the setting surface 800. The motor M5 is set in a direction in which the terminal 500A is located on the opposite side of the setting surface 800. The encoder E6 is set in a direction in which the terminal 600A is located on the opposite side of the setting surface 800. The motor M6 is set in a direction in which the terminal 700A is located on the opposite side of the setting surface 800. With such a disposition, all of the terminals 400A to 700A face the same side, that is, the opposite side of the setting surface 800. Consequently, as explained above, the wire 200, the wire 400, the wire 500, the wire 600, and the wire 700 can be bound without receiving an excessive load. Further, the distance between the motor M5 and the encoder E5 and the motor M6 and the encoder E6 can be set short. Accordingly, the length of the fourth arm 15 can be set small.

As explained above, the robot 1 includes the robot arm 10 including the fourth arm 15, which is the proximal-end-side arm, and the fifth arm 16, which is the first distal-end-side arm that is turnable with respect to the fourth arm 15 and coupled further on the distal end side than the fourth arm 15. The fourth arm 15 includes the motor M5, which is a first motor that drives the fifth arm 16, the speed reducer R5, which is a first speed reducer that reduces the rotating speed of the motor M5 and outputs a rotational force, the pulley 51, which is the first pulley that transmits, to the fifth arm 16, the rotational force output from the speed reducer R5, and the belt 52, which is a first belt that transmits, from the speed reducer R5 to the pulley 51, the rotational force output from the speed reducer R5. Consequently, as explained above, it is possible to detach the finger unit without detaching the motor M5, the speed reducer R5, the pulley 51, and the belt 52 from the fourth arm 15. That is, when the finger unit is detached, it is possible to easily perform operation for detaching the finger unit. When the finger unit is attached, it is possible to easily perform operation for attaching the finger unit. Besides the easiness of the attachment and detachment operation, it is also possible to obtain effects such as a reduction of an attachment and detachment operation time, suppression of fluctuation in assembly accuracy, and simplification of drawing-around of wires such as a power line and a control line.

The robot arm 10 includes the sixth arm 17, which is the second distal-end-side arm that is capable of turning with respect to the fifth arm 16, which is the first distal-end-side arm, and coupled further on the distal end side than the fifth arm 16. The fourth arm 15, which is the proximal-end-side arm, includes the motor M6, which is a second motor that drives the sixth arm 17, the speed reducer R6, which is a second speed reducer that reduces the rotating speed of the motor M6 and outputs a rotational force, the pulley 61, which is the second pulley that transmits, to the sixth arm 17, the rotational force output from the speed reducer R6, and a second belt that transmits, from the speed reducer R6 to the pulley 61, the rotational force output from the speed reducer R6. The motor M6, which drives the sixth arm 17, the speed reducer R6, the pulley 61, and the belt 62 are set in the fourth arm 15. Consequently, it is possible to perform the attachment and detachment operation for the finger unit without detaching these sections from the fourth arm 15. Accordingly, it is possible to more easily perform the attachment and detachment operation for the finger unit.

The fourth arm 15, which is the proximal-end-side arm, includes the first supporting section 151A and the second supporting section 151B that turnably support the fifth arm 16, which is the first distal-end-side arm. The first supporting section 151A includes the pulley 51, which is the first pulley, and the belt 52, which is the first belt. The second supporting section 151B includes the pulley 61, which is the second pulley, and the belt 62, which is the second belt. Consequently, it is possible to dispose the pulley 51 and the belt 52 and the pulley 61 and the belt 62 on opposite sides from each other making use of a structure in which the fourth arm 15 supports the fifth arm 16 by both sides. Accordingly, it is possible to prevent the first supporting section 151A and the second supporting section 151B from becoming excessively thick.

In other words, the robot 1 includes the robot arm 10 including the fourth arm 15, which is the proximal-end-side arm, the fifth arm 16, which is the first distal-end-side arm turnably coupled to the fourth arm 15, and the sixth arm 17, which is the second distal-end-side arm, the first driving unit 5 that drives the fifth arm 16 and the second driving unit 6 that dries the sixth arm 17. The first driving unit 5 and the main section 6A of the second driving unit 6 are disposed in the fourth arm 15. Consequently, it is possible to easily perform the attachment and detachment operation for the finger unit explained above.

The robot of the present disclosure is explained about the illustrated embodiment. However, the present disclosure is not limited to the embodiment. The sections of the robot can be replaced with any structures that can exert the same functions. Any structures may be added.

What is claimed is:

1. A robot comprising a robot arm including a proximal-end-side arm and a first distal-end-side arm that is turnable with respect to the proximal-end-side arm and coupled further on a distal end side than the proximal-end-side arm, wherein
    the proximal-end-side arm includes a first motor configured to drive the first distal-end-side arm, a first speed reducer configured to reduce rotating speed of the first motor and output a rotational force, a first pulley configured to transmit, to the first distal-end-side arm, the rotational force output from the first speed reducer, and a first belt configured to transmit, from the first speed reducer to the first pulley, the rotational force output from the first speed reducer,
    wherein the proximal-end-side arm includes a shaft that is inserted into the first pulley and the first distal-end-side arm and transmits the rotational force of the first pulley to the first distal-end-side arm,
    the shaft can be inserted into or removed from the first pulley and the first distal-end-side arm,
    wherein the proximal-end-side arm includes a first supporting section and a second supporting section configured to turnably support the first distal-end-side arm, a projecting section projecting in a tubular shape toward an inner side of the first supporting section is formed in a portion of an inner wall of the first supporting section facing the first distal-end-side arm,
    the first pulley includes an outer cylinder and an inner cylinder, the outer cylinder is formed in a bottomed shape and the inner cylinder is erected from a bottom of the outer cylinder, the inner cylinder is longer than the outer cylinder,
    a bore section of the inner cylinder is opened to the outer cylinder, the shaft is inserted into the inner cylinder from an open side, and the inner cylinder is inserted into an inner circumferential portion in the tubular shave of the projecting section.

2. The robot according to claim 1, wherein
    the robot arm includes a second distal-end-side arm that is turnable with respect to the first distal-end-side arm and coupled further on the distal end side than the first distal-end-side arm, and
    the proximal-end-side arm includes a second motor configured to drive the second distal-end-side arm, a second speed reducer configured to reduce rotating speed of the second motor and output a rotational force, a second pulley configured to transmit, to the second distal-end-side arm, the rotational force output from the second speed reducer, and a second belt configured to transmit, from the second speed reducer to the second pulley, the rotational force output from the second speed reducer.

3. The robot according to claim 2, wherein
the first supporting section includes the first pulley and the first belt, and
the second supporting section includes the second pulley and the second belt.

4. The robot according to claim 3, wherein the first distal-end-side arm is disposed between the first supporting section and the second supporting section.

5. The robot according to claim 3, wherein the first distal-end-side arm includes a power transmitting section configured to transmit the rotational force of the second pulley to the second distal-end-side arm.

6. A robot comprising a robot arm including a proximal-end-side arm and a first distal-end-side arm that is turnable with respect to the proximal-end-side arm and coupled further on a distal end side than the proximal-end-side arm, wherein
the proximal-end-side arm includes a first motor configured to drive the first distal-end-side arm, a first speed reducer configured to reduce rotating speed of the first motor and output a rotational force, a first pulley configured to transmit, to the first distal-end-side arm, the rotational force output from the first speed reducer, and a first belt configured to transmit, from the first speed reducer to the first pulley, the rotational force output from the first speed reducer,
wherein the proximal-end-side arm includes a shaft that is inserted into the first pulley and the first distal-end-side arm and transmits the rotational force of the first pulley to the first distal-end-side arm,
the shaft can be inserted into or removed from the first pulley and the first distal-end-side arm,
wherein the robot arm further includes a second distal-end-side arm that is turnable with respect to the first distal-end-side arm and coupled further on the distal end side than the first distal-end-side arm,
the proximal-end-side arm further includes:
a first encoder configured to detect a rotation amount of the first motor;
a second motor configured to drive the second distal-end-side arm;
a second encoder configured to detect a rotation amount of the second motor;
a first wire coupled to the first motor, a second wire coupled to the first encoder, a third wire coupled to the second motor and a fourth wire coupled to the second encoder pass a same side of the second motor and the second encoder.

* * * * *